United States Patent [19]

Hupfer

[11] Patent Number: 4,871,833

[45] Date of Patent: Oct. 3, 1989

[54] POLYAMIC ACIDS, POLYIMIDES PREPARED FROM THESE AND PROCESS FOR PRODUCING HIGH-TEMPERATURE RESISTANT LAYERS

[75] Inventor: Bernd Hupfer, North Kingstown, R.I.

[73] Assignee: Hoechst Aktiengesellschaft, Frankfurt am Main, Fed. Rep. of Germany

[21] Appl. No.: 45,570

[22] Filed: May 4, 1987

[30] Foreign Application Priority Data

May 3, 1986 [DE] Fed. Rep. of Germany ....... 3615039

[51] Int. Cl.$^4$ ............................................. C08G 69/26
[52] U.S. Cl. ................................... 528/353; 528/185; 528/125; 528/126; 528/128
[58] Field of Search ................ 528/353, 185, 125, 126, 528/128

[56] References Cited

U.S. PATENT DOCUMENTS

| 3,179,614 | 4/1965 | Edwards | 260/302 |
| 4,063,984 | 12/1977 | Critchley | 528/176 |
| 4,535,115 | 8/1985 | Bakshi et al. | 524/376 |
| 4,629,777 | 12/1987 | Pfeifer | 528/353 |

FOREIGN PATENT DOCUMENTS

| 0040042 | 11/1981 | European Pat. Off. . |
| 0179604 | 4/1986 | European Pat. Off. . |
| 1520767 | 5/1972 | Fed. Rep. of Germany . |
| 1764977 | 12/1976 | Fed. Rep. of Germany . |
| 58-152018 | 9/1983 | Japan . |
| 59-113035 | 6/1984 | Japan . |
| 1216505 | 12/1970 | United Kingdom ................ 528/353 |
| 2101149 | 1/1983 | United Kingdom . |

OTHER PUBLICATIONS

"Patent Abstracts of Japan", Band 7, No. 273 (C-198) [1418], Dec. 6, 1983.
"Patent Abstracts of Japan", Band 8, No. 232 (C-248) [1669], Oct. 25, 1984.
Industry News, "Ultrapure Polyimide Spurs use in the Semiconductor Industry", reprinted from Semiconductor Int'l. 1/84, Dupont, 18 pages.

*Primary Examiner*—John Kight
*Assistant Examiner*—M. L. Moore
*Attorney, Agent, or Firm*—Foley & Lardner, Schwartz, Jeffery, Schwaab, Mack, Blumenthal & Evans

[57] ABSTRACT

Described are polyamic acids, at least 50 mole-% of which are comprised of recurrent units corresponding to the general formula I:

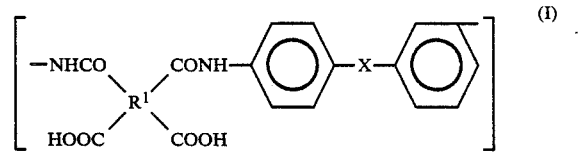

wherein,
$R^1$ is a mono-, di-, tri- or tetranuclear aromatic group and
X is O, S, CO, SO$_2$ or CR$^2$R$^3$, each one of $R^2$ and $R^3$ being H or CH$_3$.

A polyamic acid of the present invention, in the form of a solution, is applied to a substrate, for example, a semiconductor device, to form a protective layer thereon, and is converted into polyimide by heating. As against comparable compounds known in the art, the polyamic acids of the present invention are distinguished by a lower inherent viscosity at an unchanged molecular weight and, consequently, by an improved processability at an equally good thermal stability.

10 Claims, No Drawings

POLYAMIC ACIDS, POLYIMIDES PREPARED FROM THESE AND PROCESS FOR PRODUCING HIGH-TEMPERATURE RESISTANT LAYERS

BACKGROUND OF THE INVENTION

The present invention relates to polyamic acids which are used as intermediate products for the preparation of electrically insulating high-temperature resistant layers of polyimides. The polyimide layers serve, in particular, as protective layers and insulating intermediate layers for electronic components and circuits on semiconductors or metals.

The use of polyimides for high-temperature resistant layers on and in semiconductor devices is known, for example, from German Pat. No. 1,764,977. The polyimides are prepared by polycondensation of aromatic diamines, for example, 4,4'-diamino-diphenyl ether, with aromatic tetracarboxylic acid anhydrides, for example, pyromellitic dianhydride, to give polyamic acids. The polyamic acids are heated, thereby splitting off water and forming polyimide. These polyimides, if their molecular weights are high enough, have the required temperature resistance and the desired electrical properties. The solutions of the corresponding high-molecular weight polyamic acids, have a high viscosity, already at relatively low concentrations. These solutions of high-molecular weight polyamic acids are therefore processed with difficulty. The high-molecular weight polyimides as such are usually relatively brittle and can only insufficiently planarize, i.e., embed in a layer having a plane surface, the conductive paths covered by them.

A reduced viscosity at an unchanged molecular weight is obtained, when pyromellitic acid is entirely or partly replaced by benzophenone-3,3',4,4'-tetracarboxylic acid. Polyamic acids of that type and polyimides prepared therefrom are described in German Pat. No. 1,520,767. In the publication "Pyralin, Polyimide Coatings for Electronics", Bulletin PC-1 by E. I. du Pont de Nemours and Co., Wilmington, U.S.A., the improved planarizing effect of these polyimides is pointed out. The corresponding polyamide acids, however, tend at relatively low temperatures to enter into cross-linking reactions to form insoluble products. The processing range of these intermediate products is therefore limited. This disadvantage is more pronounced as the proportion of benzophenone-tetracarboxylic acid units increases. Therefore, the reduction in viscosity which can practically be achieved is limited. In addition, the thermal stability of polyimides based on pyromellitic acid derivatives is generally higher than the thermal stability of polyimides prepared from benzophenonetetracarboxylic acid derivatives.

The diamine components of the polyamic acids have also been varied, but particular changes of properties in connection therewith have not been described. For example, in U.S. Pat. No. 3,179,614, phenylene diamines, naphthylene diamines, xylylene diamines, substituted benzidines, diaminopyridines and diaminodiphenyl ethers, -diphenyl sulfides -diphenyl sulfones, -diphenyl methanes and -benzophenones are disclosed as diamine components. In addition to the 4,4'-isomers of the binuclear compounds, this patent also discloses 3,3'-diamino-diphenyl sulfone and 3,4'-diamino-biphenyl. Examples of the application of the binuclear compounds are only given for the 4,4'-isomers.

SUMMARY OF THE INVENTION

It is therefore an object of the present invention to provide a polyamic acid for use in preparation of an electrically insulating high-temperature resistant layer of polyimide.

It is also an object of the present invention to provide a polyamic acid having reduced viscosity at a higher solids content than that present in the prior art.

It is a further object of the present invention to provide an electrically insulating high-temperature resistant polyimide.

It is still a further object of the present invention to provide a polyimide resistant to penetrating contaminants.

It is another object of the present invention to provide a process for producing a firmly-adhering, electrically insulating, high-temperature-resistant polyimide.

It is yet another object of the present invention to provide polyamic acids which, at a molecular weight corresponding to that of known compounds of the same type, exhibit a lower viscosity in solution and result in polyimides which produce an improved planarization, without giving rise to any loss in processing range.

In accordance with one aspect of the present invention, these objects are achieved by a polyamic acid comprising at least 50 mole-% of a recurrent unit having the formula I:

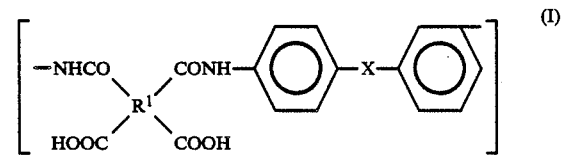

wherein $R^1$ is a mono-, di-, tri- or tetranuclear aromatic group and

X is O, S, CO, SO$_2$ or CR$^2$R$^3$, each one of R$^2$ and R$^3$ being H or CH$_3$.

In accordance with another aspect of the present invention, these objects are achieved by a process for producing firmly-adhering, electrically insulating, high-temperature resistant layers on articles, comprising the steps of: providing a polyamic acid according to the above, applying a solution of the polyamic acid to the surface to be coated, drying the solution and converting the resulting polyamic acid layer into polyimide by heating to a temperature in the range of from about 180° to about 400° C.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The present invention comprises a polyamic acid, at least 50 mole-% of which is comprised of recurrent units corresponding to the general formula I:

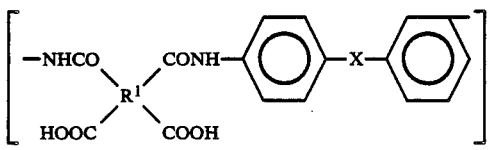

(I)

wherein,
R¹ is a mono-, di-, tri- or tetranuclear aromatic group and
X is O, S, CO, SO₂ or CR²R³,
R² and R³ being identical or different and denoting H or CH₃.

The present invention also comprises a polyimide, at least 50 mole-% of which is comprised of recurrent units corresponding to the general formula V:

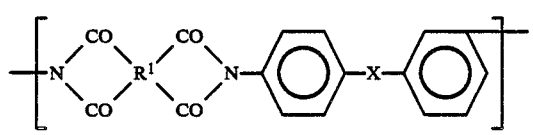

(V)

wherein,
R¹ is a mono-, di-, tri- or tetranuclear aromatic group and
X is O, S, CO, SO₂ or CR²R³,
R² and R³ being identical or different and denoting H or CH₃.

The present invention further comprises a process for producing firmly-adhering, electrically insulating, high-temperature resistant layers on articles, comprising the steps of: applying a solution of a polyamic acid to the surface to be coated, drying the solution and converting the resulting polyamic acid layer into polyimide by heating to a temperature in the range of from about 180° to about 400° C., the process being characterized in that a solution of a polyamic acid corresponding to formula I indicated above is used.

The polyamic acids of the present invention contain, on an average, from about 2 to about 400, preferably from about 20 to about 200, units of formula I.

When R¹ in formula I contains more than one aromatic ring, these rings are preferably linked to one another by single bonds or substituents. R¹ can, in particular, be a phen-1,2,4,5-tetrayl group or a group corresponding to formula II:

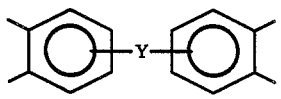

(II)

wherein,
Y is a single bond, a group having the above-indicated signification of X or a group corresponding to that of formula III:

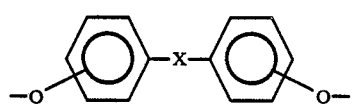

(III)

wherein, X has the above-indicated signification.

In addition to the units of formula I, the polyamic acids of the invention may contain other units formed from tetracarboxylic acids and diamines, which are based on the same tetracarboxylic acids and different diamines, in particular, units corresponding to formula IV:

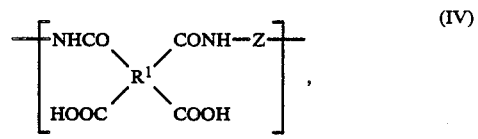

(IV)

wherein,
Z is a group having the formula:

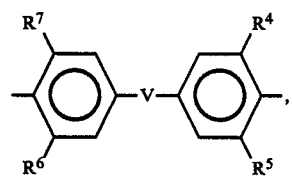

a group having the formula:

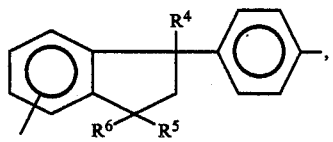

a phenylene group, a naphthylene group or a group having the formula:

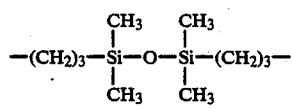

wherein,
R⁴, R⁵, R⁶ and R⁷ are identical or different and denote hydrogen atoms or alkyl groups having from 1 to 3 carbon atoms and
V is a single bond or a group having the above-indicated signification of X or one of the groups:

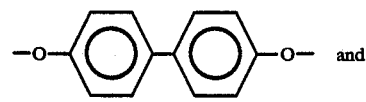 and

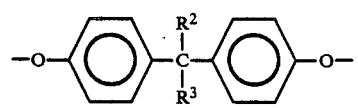

The corresponding copolymers may contain up to 50 mole-%, preferably not more than 30 mole-%, of units corresponding to formula IV. Within a single polyamic acid, units derived from different tetracarboxylic acids and different diamines may be present.

In the general formulas, $R^1$ is preferably a mono or binuclear aromatic group. X is preferably CO, $CR^2R^3$ or O, especially O.

The polyamic acids of the present invention are prepared as follows:

In an inert gas atmosphere, the diamine compound is dissolved with stirring in an inert solvent which is free of water and amines.

Preferably, inert solvents are those which dissolve the intermediate product of the polyamic acid type formed, for example, N-methylpyrrolidone, N,N-dimethylacetamide, N,N-dimethylformamide, N,N-diethylformamide, dimethylsulfoxide, hexamethylphosphoric acid triamide, tetramethylenesulfone and N-methylpiperidone. It is possible to use these solvents individually, in combination with each other or in combination with non-solvents, such as benzene, benzonitrile, dioxane, butyrolactone, xylene, toluene, cyclohexane, 2-methoxy-ethanol, acetone and propylene glycol monomethyl ether.

The solution is kept at a temperature below about 30° C. by external cooling, while adding the tetracarboxylic acid dianhydride. The resulting mixture is stirred until the tetracarboxylic acid dianhydride has completely dissolved. In the process, the viscosity of the reaction system rises while the polyamic acid is formed.

When preparing polyamic acids with defined molecular weights from the tetracarboxylic acid dianhydrides and diamines it is necessary that the monomers are of maximum purity. The monomers are preferably purified prior to the reaction process, by recrystallization, sublimation, distillation, melt crystallization or zone refining. It is also necessary to use the tetracarboxylic acid dianhydride with substantially equimolar quantities of diamine, the tolerance being below about ±5 mole-%. Preferably, a slight excess of diamine compound of approximately 1 to about 3 mole-% is employed.

The resulting polyamic acid solutions have solids contents ranging from about 6 to about 45%, preferably from about 10 to about 30% and viscosities ranging from about 500 to about 10,000 mPa·s, preferably from about 800 to about 7,000 mPa·s. The inherent viscosity of the polymers is at least about 0.1 dl/g, preferably from about 0.3 to about 1.5 dl/g. The inherent viscosity is defined as follows:

$$\eta\text{inh.} = \frac{\ln \frac{\eta \text{ solution}}{\eta \text{ solvent}}}{c},$$

c being the concentration in grams of polymer per 100 ml of solution. The viscosity of the polymers according to the present invention is, in each case, measured at about 25° C. of a 0.5% strength solution in N-methylpyrrolidone.

The present invention is further explained in detail as illustrated by the following examples of application and comparative reference examples.

EXAMPLE 1

(a) In a 500 ml reaction vessel equipped with a thermometer and stirrer 12.5 g (0.0625 mole) of distilled 3,4'-diamino-diphenyl ether and 100 g of N-methyl-pyrrolidone were placed under a nitrogen atmosphere and the mixture was vigorously stirred until the diamine had completely dissolved. The reaction vessel had a cooling jacket through which water circulated. 13.4 g (0.0614 mole) of recrystallized pyromellitic dianhydride in coarse lumps were added to the solution at one time. 133 g of N-methyl-pyrrolidone were added and the reaction mixture was stirred until the tetracarboxylic acid anhydride had completely dissolved. By the reaction taking place, a solution was obtained, which contained 10% by weight of polyamic acid. The solution had a viscosity of 194 mPa·s at 25° C. and the value calculated for the inherent viscosity was 0.78 dl/g.

(b) A polyamic acid solution prepared according to the procedure described under (a) above, from 12.5 g of 3,4'-diamino-diphenyl ether and 13.4 g of pyromellitic dianhydride, which contained 17% of resin, had a viscosity of 2,420 mPa·s at 25° C. and an inherent viscosity of 0.79 dl/g.

(c) (Reference)

A solution prepared according to the procedure described under (a) above, from 12.5 g of 4,4'-diamino-diphenyl ether and 13.4 g of pyromellitic dianhydride, which contained 10% of polyamic acid, had a viscosity of 2,150 mPa·s at 25° C. and an inherent viscosity of 1.33 dl/g.

EXAMPLE 2

(a) According to the procedure described in Example 1(a), 12.5 g (0.0625 mole) of 3,4'-diaminodiphenyl ether were reacted with 19.8 g (0.0614 mole) of 3,3',4,4'-benzophenone-tetracarboxylic dianhydride in 291 g of N-methylpyrrolidone. The resulting solution which contained 10% of polyamic acid had a viscosity of 98 mPa·s at 25° C. and an inherent viscosity of 0.64 dl/g.

(b) A 17% strength polyamic acid solution prepared according to the procedure described in Example 1(a), from 12.5 g of 3,4'-diamino-diphenyl ether and 19.8 g of 3,3',4,4'-benzophenone-tetracarboxylic dianhydride, had a viscosity of 376 mPa·s at 25° C. and an inherent viscosity of 0.63 dl/g.

(c) (Reference)

According to the procedure described in Example 1(a), 12.5 g of 4,4'-diamino-diphenyl ether were reacted with 19.8 g of 3,3',4,4'-benzophenone-tetracarboxylic dianhydride in 291 g of N-methylpyrrolidone. The resulting solution, which contained 10% of polyamic acid, had a viscosity of 376 mPa·s at 25° C. and an inherent viscosity of 0.95 dl/g.

EXAMPLE 3

According to the procedure described in Example 1(a), a mixture of 7.5 g (0.0375 mole) of 4,4'-diaminodiphenyl ether and 17.5 g (0.0875 mole) of 3,4'-diaminodiphenyl ether was reacted with 26.9 g (0.123 mole) of pyromellitic dianhydride in 468 g of N-methylpyrrolidone. The resulting solution which contained 10% of polyamic acid had a viscosity of 480 mPa·s at 25° C. and an inherent viscosity of 0.98 dl/g.

EXAMPLE 4

(a) The lacquer obtained in Example 1(a) was cast onto a glass plate to produce a coating on the plate. The coated plate was heated for 2 hours at 100° C. and, as a result, a from 40 to 50 μm thick film was formed. The film was again heated for 1 hour at 220° C. and then for 1 hour at 350° C.

With the aid of a differential thermobalance, the temperature at which weight loss started was determined at 450° C.; the rate of weight loss determined in an air stream at 455° C. was 18.4%/h.

(b) A film was prepared as described under (a) above using the lacquer obtained in Reference Example 1(c). The temperature at which weight loss started was determined at 450° C.; the rate of weight loss determined in an air stream at 458° C. was 16.4%/h. This result shows that the polymers of the present invention have substantially the same temperature resistance as the isomeric compounds known in the art.

EXAMPLE 5

(a) A transistor equipped with an aluminum electrode was coated with the lacquer obtained in Example 1(a). Then the transistor was heated for 1 hour at 100° C. and for another hour at 220° C. After masking with photoresist, the area directly above the aluminum electrode was etched with hydrazine, followed by heating for 1 hour at 350° C. Thereafter aluminum was vacuum-deposited such that a double-layer structure resulted. The current transfer ratio [change of $h_{FE}$-linearity=($h_{FE}$-linearity after treatment at 520° C.)−($h_{FE}$-linearity prior to heat treatment)] of the transistor thus obtained was +0.3%.

(b) (Reference)

A transistor having a double-layer structure was prepared as described under (a) above, using the lacquer obtained in Example 1(c) (Reference). The current transfer ratio of the transistor was +0.3%.

As shown by the results of Example 5, the electrical properties of a transistor coated with customary polyimides derived from 4,4′-diamino-diphenyl ether are substantially the same as those of transistors coated with polyimides of the present invention which are derived from 3,4′-diamino-diphenyl ether.

EXAMPLE 6

(a) Silicon dioxide lines being 0.9 μm high and 3 μm wide and spaced 7 μm apart on a silicon wafer were spin-coated at 5,000 rpm with a layer of the lacquer obtained in Example 1(b). The lacquer was then heated for one hour at 250° C. and for another hour at 350° C. The degree of planarization (see. L. B. Rothman, *J. Electrochem. Soc.* 127, 2216-20 (1980)) was 50%.

(b) (Reference)

A wafer carrying silicon dioxide lines as under (a) was spin-coated at 5,000 rpm with a layer of the lacquer obtained in Example 1(c). After heat treatment, the degree of planarization was 29%.

As can be seen from the above description, solutions of intermediate products of the polyamic acid type which, from the point of view of processing technique, have more favorable properties (reduced viscosity at a higher solids content) are available when replacing the usually employed 4,4′-diamino-diphenyl ether by 3,4′-diamino-diphenyl ether. The novel intermediate products of the polyamic acid type have the same good electrical and thermal properties as those of the prior art and considerably improved planarization properties.

EXAMPLE 7

The surface of a silicon wafer which was covered with a first patterned layer of aluminum conductors was spin-coated with the polyamic acid solution obtained according to Example 1(a). The solution was dried and heated for 1 hour at 130° C. A commercial positive photoresist solution based on naphthoquinone diazides and novolacs was applied to the still uncured polyamic acid layer. The photoresist was dried, exposed and developed with a commercial aqueous-alkaline developer solution. In the development process, the photoresist layer and also the underlying polyamic acid layer were removed in the exposed areas and the surface of the aluminum layer was uncovered. The photoresist stencil was then removed with acetone and the polyamic acid layer heated for 1 hour at 350° C.

The polyimide stencil obtained covered the aluminum conductors such that only the desired contact points were left free. On the entire surface a second aluminum layer was vacuum-deposited and structured to form a layer of conductors in the usual manner by a photolithographic process.

EXAMPLE 8

This example shows the application of a polyimide according to the present invention as a protective layer which is applied to the surface of a transistor to prevent contaminants from penetrating. A transistor with laterally disposed contacts, produced on a silicon wafer in a known manner, was coated with a polyamic acid layer according to Example 2(b). The layer was dried, heated for one hour at 100° C. and for another hour at 220° C. The resulting polyimide layer was spin-coated with a commercial negative-working photoresist solution and dried. The photoresist was exposed under an original, in which the contact points only were covered. By developing, the polyimide layer, which is insoluble in the developer, was uncovered at the contact points and then etched with hydrazine. The photoresist stencil was removed and the polyimide layer cured for 1 hour at 350° C. A transistor was obtained, the surface of which was protected by the polyimide layer with the exception of the contact points.

What is claimed is:

1. A polyamic acid comprising at least 50 mole-% of a recurrent unit having the formula I:

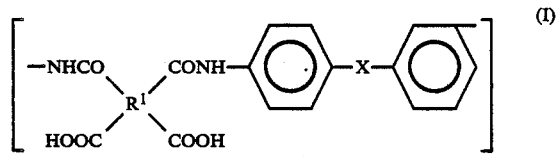

wherein
$R^1$ is a mono-, di-, tri- or tetranuclear aromatic group and
X is O, S, CO, $SO_2$ or $CR^2R^3$, each one of $R^2$ and $R^3$ being H or $CH_3$.

2. A polyamic acid as claimed in claim 1, wherein $R^1$ is a phen-1,2,4,5-tetrayl group or a group having the formula II:

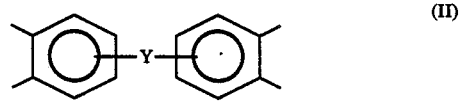

wherein
Y is a single bond, a member of the group consisting of O, S, CO, $SO_2$ and $C^2R^3$, each one of $R^2$ and $R^3$ being H or $CH_3$ or a group having the formula III:

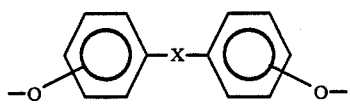
(III)

wherein
X is O, S, CO, SO$_2$ or CR$^2$R$^3$, each one of R$^2$ and R$^3$ being H or CH$_3$.

3. A polyamic acid as claimed in claim 1, further comprising a recurrent unit having the formula IV:

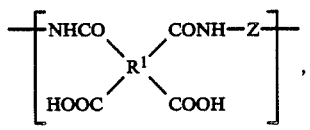
(IV)

wherein
Z is a group having the formula:

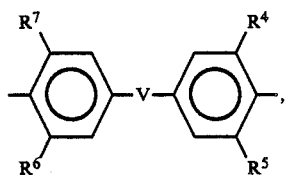

a group having the formula:

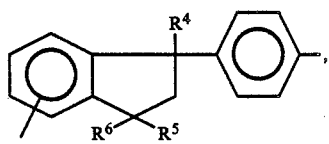

a phenylene group, a naphthylene group or a group having the formula:

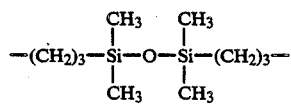

wherein each one of R$^4$, R$^5$, R$^6$ and R$^7$ is a hydrogen atom or alkyl group having from 1 to 3 carbon atoms and V being a single bond, a member of the group consisting of O, S, CO, SO$_2$ and CR$^2$R$^3$, each one of R$^2$ and R$^3$ being H or CH$_3$ or one of the groups

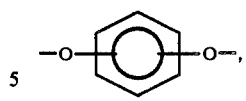

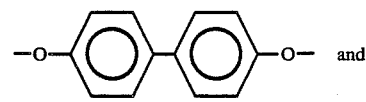  and

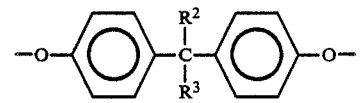

4. A polyimide, comprising at least 50 mole-% of a recurrent unit having the formula V:

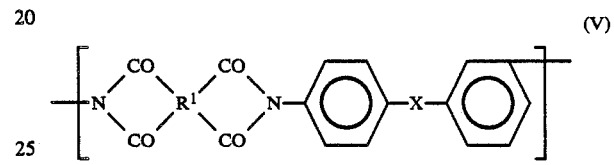
(V)

wherein
R$^1$ is a mono-, di-, tri- or tetranuclear aromatic group and
X is O, S, CO, SO$_2$ or CR$^2$R$^3$, each one of R$^2$ and R$^3$ being H or CH$_3$.

5. A polyamic acid as claimed in claim 1, wherein said polyamic acid comprises from about 2 to about 400 units having the formula I.

6. A polyamic acid as claimed in claim 1, wherein said polyamic acid comprises from about 20 to about 200 units having the formula I.

7. A polyamic acid as claimed in claim 3, wherein said polyamic acid comprises up to 50 mol-% of units having the formula IV.

8. A polyamic acid as claimed in claim 1, wherein said polyamic acid comprises an inherent viscosity of from about 0.3 to about 1.5 dl/g.

9. A process for producing firmly-adhering, electrically insulating, high-temperature resistant layers on articles, comprising the steps of: providing a polyamic acid according to claim 1, applying a solution of said polyamic acid to the surface to be coated, drying said solution and converting the resulting polyamic acid layer into polyimide by heating to a temperature in the range of from about 180° to about 400° C.

10. The product produced by the process of claim 9.

* * * * *